United States Patent [19]
Sutton et al.

[11] Patent Number: 4,495,309
[45] Date of Patent: Jan. 22, 1985

[54] REACTION INJECTION MOLDED POLYURETHANES, POLYUREAS AND POLYUREA-URETHANES EMPLOYING THIAPOLYCYCLIC POLYISOCYANATES

[75] Inventors: Tonja R. Sutton; David W. Hughes, both of Midland, Mich.

[73] Assignee: The Dow Chemical Company, Midland, Mich.

[21] Appl. No.: 610,453

[22] Filed: May 15, 1984

[51] Int. Cl.³ ............................................. C08G 18/14
[52] U.S. Cl. ..................................... 521/51; 521/161; 528/73; 264/51; 264/328.1; 264/328.6; 264/328.8

[58] Field of Search .................... 521/51, 161; 528/73; 264/51, 328.1, 328.6, 328.8

[56] References Cited

U.S. PATENT DOCUMENTS 4,442,235 4/1984 Taylor et al. ...................... 521/163

Primary Examiner—Maurice J. Welsh

[57] ABSTRACT

Reaction injection moldings (RIM) having increased heat resistance are provided by substituting a thiapolycyclic polyisocyanate such as dimethyl-9-thiabicyclononane diisocyanate for the aromatic polyisocyanate in an otherwise conventional RIM composition.

14 Claims, No Drawings

REACTION INJECTION MOLDED POLYURETHANES, POLYUREAS AND POLYUREA-URETHANES EMPLOYING THIAPOLYCYCLIC POLYISOCYANATES

BACKGROUND OF THE INVENTION

This invention relates to reaction injection molded polyurethanes, polyureas and polyurea-urethanes which are prepared using aliphatic polyisocyanates.

Reaction injection molded polyurethanes are well-known in the art as described by F. Melvin Sweeney in *Introduction to Reaction Injection Molding*, Technomics, Inc., 1979. The use of reaction injection molding (RIM) of polyurethanes in the production of structural parts for automotive applications such as fenders, doors and body panels as well as in other applications such as computer housings, office equipment housings, sports equipment and the like is well-known.

In the practice of RIM processes to produce a molding having a compact surface skin, a mold is filled with a highly reactive, liquid starting component within a very short time by means of a high output, high pressure dosing apparatus after the components have been mixed in so-called positively controlled mixing heads. In such "one-shot" processes, the highly reactive starting materials which are generally a polyether or a polyester having a plurality of active hydrogen moieties, a polyisocyanate and a chain extender such as a diol or a polyamine as well as other conventional additives such as blowing agents, catalysts, fillers and the like, are delivered mechanically within a very short time (generally from 2 to 4 seconds) and mixed at the same time and introduced into the mold in which the mixture is cured to yield the finished product within a time (generally from 1 to 2 minutes) and thereby produce a polyurethane product. The polyurethane-forming compositions have been the material of choice for RIM applications due to their short reaction times and easy handling which thereby allows rapid cure and short cycle times. Unfortunately, such formulations often do not have sufficient temperature resistance to withstand paint curing conditions employed by the automotive industry without deformation. While such deficiencies arising from low temperature resistance of finished parts have been overcome to some extent by the use of various diamines as chain extenders instead of diols, such amines are often highly reactive thus leading to premature cure prior to the filling of the mold. In addition, even further increase in temperature resistance of the resulting RIM part is desired for many applications which could otherwise advantageously employ RIM structural parts.

In view of the foregoing deficiencies of conventional RIM formulations, it would be highly desirable to provide a formulation which can be introduced into the mold without significant premature curing and which yields a finished molded article capable of withstanding temperatures as high as 325° F. while retaining original dimensions and physical properties.

SUMMARY OF THE INVENTION

The present invention is, in one aspect, such a reaction injection molding (RIM) formulation comprising a polyahl, a normally liquid thiapolycyclic polyisocyanate and a urethane and/or a urea catalyst in proportions such that upon subjecting the formulation to conditions of a conventional RIM process, a useful RIM article is formed.

In another aspect, this invention is a process for the production of a RIM polyurethane, polyurea or polyurea-urethane article which comprises subjecting in a one-shot procedure the RIM formulation to conditions sufficient to form a reaction injection molding.

In a final aspect, the present invention is the reaction injection molded article resulting from the practice of the aforementioned process in the form of a foam or a solid article.

Surprisingly, the normally liquid thiapolycyclic polyisocyanates employed in the practice of the present invention contribute significantly to the structural rigidity and temperature resistance of the resulting molded part, but exhibit reduced reactivity sufficient to avoid significant amounts of premature curing. For the purposes of this invention, premature curing means that the highly reactive formulation cures prior to complete filling of the mold with the formulation.

The various aspects of the present invention are particularly useful in the preparation of various automotive parts such as structural parts including fenders, doors, quarter panels and the like as well as in the manufacture of computer housings, office equipment housings, sports equipment and many other applications where RIM processes have heretofore been employed.

DETAILED DESCRIPTION OF REPRESENTATIVE EMBODIMENTS

The polyahl suitably employed in the practice of this invention includes any organic compound having (1) at least two active hydrogen moieties, and (2) a number average molecular weight ($M_n$) of at least 60. Preferably, the polyahl is a polymer having an $M_n$ of at least 200 and at least three repeating units of a monomeric moiety. For the purposes of this invention, an active hydrogen moiety refers to a moiety containing a hydrogen atom which, because of its position in the molecule, displays significant activity according to the Zerewitnoff test described by Woller in the *Journal of American Chemical Society*, Vol. 49, page 3181 (1927). Illustrative of such active hydrogen moieties are —COOH, —OH, —NH$_2$, —NH—, —CONH$_2$, —SH and —CONH—. Typical nonthiacyclic polyahls include polyols, polyamines, polyamides, polymercaptans and polyacids.

Of the foregoing polyahls, the polyols are preferred. Examples of such polyols are the polyol polyethers, the polyol polyesters, hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers including polythioethers, acetals including polyacetals, aliphatic and aromatic polyols and thiols including polythiols, ammonia and amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and a hydroxyl group. Also alkylene adducts of compounds which contain one —SH group and one —OH group, as well as those which contain an amino group and a —SH group, may be used.

Polyether polyols which are most advantageously employed as the polyahl in the practice of this invention are the polyalkylene polyether polyols including the polymerization products of alkylene oxides and other oxiranes with water or polyhydric alcohols having from two to eight hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerin, 1,1,1-trimethylolpropane, 1,1,1-trimethylolethane, hexane-1,2,6-triol, α-methyl glucoside, pentaerythritol, erythritol, pentatols and hexatols. Also included within the term "polyhydric alcohol" are sugars such as glucose, sucrose, fructose and maltose as well as compounds derived from phenols such as 2,2-(4,4'-hydroxyphenyl)propane, commonly known as bisphenol A. Illustrative oxiranes that are advantageously employed in the preparation of the polyether polyol include simple alkylene oxides such as ethylene oxide, propylene oxide, butylene oxide, and amylene oxide; glycidyl ethers such as t-butyl glycidyl ether and phenyl glycidyl ether; and random or block copolymers of two or more of these oxiranes. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have primary, secondary or tertiary hydroxyl groups and, preferably, are polyethers prepared from alkylene oxides having from two to six carbon atoms such as ethylene oxide, propylene oxide and butylene oxide. The polyalkylene polyether polyols may be prepared by any known process such as, for example, the process disclosed by Wurtz in 1859 and *Encyclopedia of Chemical Technology,* Vol. 7, pp. 257-262, published by Interscience Publishers, Inc. (1951), or in U.S. Pat. No. 1,922,459. Also suitable are polyether polyols and processes for preparing them that are described in Schick, M. J., *Nonionic Surfactants,* Marcel Dekker, Inc., New York (1967), U.S. Pat. Nos. 2,891,073; 3,058,921; 2,871,219 and British Pat. No. 898,306. Polyether polyols which are most preferred include the alkylene oxide addition products of water, trimethylolpropane, glycerine, pentaerythritol, sucrose, sorbitol, propylene glycol and blends thereof having hydroxyl equivalent weights of from about 250 to about 5000.

Suitable polyhydric thioethers which are sometimes advantageously condensed with alkylene oxides include the reaction product of thiodiglycol with alkylene oxides or dihydric alcohols such as disclosed above.

Polyhydroxyl-containing phosphorus compounds which are optionally used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Polyacetals (acetal resins) which are optionally reacted with alkylene oxides or other oxiranes include the reaction product of formaldehyde or other suitable aldehyde with a polyhydric alcohol or an oxirane such as those disclosed above. Polyacetals derived from acetone or from cyclic acetals are also suitably employed.

Aliphatic and aromatic thiols which are optionally reacted with alkylene oxides and other oxiranes include alkane thiols such as 1,2-ethane dithiol, 1,2-propane dithiol and 1,6-hexane dithiol; alkene thiols such as 2-butene-1,4-dithiol; and alkyne thiols such as 3-hexyne-1,6-dithiol; and arene thiols such as 1,4-benzene dithiol.

Other thiols suitable for this purpose are hydrogen sulfide as well as thio functional polymers such as polyvinylbenzyl thiol.

Acids and amides which are optionally reacted with alkylene oxides and other oxiranes include difunctional fatty acids such as hydroxystearic and dihydroxystearic acid as well as amides such as fatty acid alkanol amides, e.g., lauroyl monoethanolamide; diacids such as adipic and terephthalic acid; sulfonamides and other acids and amides set forth in Schick, supra.

Additional polyethers and methods for their preparation are set forth in Schick, supra.

Examples of suitable hydroxyl-containing polyesters include those obtained from polycarboxylic acids and polyhydric alcohols. Examples of suitable polycarboxylic acids include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol and sorbitol. Also included with the term "polyhydric alcohol" are compounds derived from phenols such as 2,2-(4,4'-hydroxyphenyl)propane, commonly known as bisphenol A, bis(4,4'-hydroxyphenyl)sulfide and bis(4,4'-hydroxyphenyl)sulfone.

Of particular interest in forming the polyurea-urethanes of the present invention are the partially aminated and/or partially amine terminated polyethers as described in U.S. Pat. No. 4,269,945 and EPO Application Nos. 93,861; 93,862 and 81,701. To prepare polyureas, it is desirable to use totally aminated and/or totally amine terminated polyols by the process described in U.S. Pat. No. 4,153,581.

Amines which are optionally reacted with alkylene oxides and other oxiranes include aromatic amines such as aniline, o-chloroaniline, p-amino aniline, 1,5-diamino naphthalene, methylene dianiline, the condensation products of aniline and formaldehyde and 2,4-diamino toluene; aliphatic amines such as methylamine, triisopropanolamine, isopropanolamine, diisopropanolamine, ethylenediamine, 1,3-propylenediamine, 1,4-butylenediamine and 1,3-butylenediamine, mixtures thereof and the like.

Other polyahls suitably employed include polylactones; hydroxy functional acrylic polymers such as polymers of hydroxyethyl acrylate and hydroxypropyl acrylate; polyvinyl acetate and other polymers of vinyl acetate and other ethylenically unsaturated carboxylic acids; hydroxyl-containing epoxy resins; urea-formaldehyde and melamine-formaldehyde resins; hydroxyl-containing polycarbonates and polyurethanes; methylol resins; starches and other cellulosic polymers; esters of phosphoric, sulfonic, sulfuric and boric acid; and polypeptides.

In addition, the polyahl suitably contains a copolymer dispersed therein (often such dispersions are called copolymer polyols), e.g., copolymer polyols described in U.S. Pat. No. Re. 29,118, U.S. Pat. No. Re. 29,014 and U.S. Pat. No. 4,390,645.

In addition to the preferred polyether polyols and partially and totally amine terminated polyether polyols, certain thiapolycyclic polyahls as described in U.S. patent application Ser. No. 520,980 filed Aug. 8, 1983 is also preferably employed herein as the polyahl or as a chain extender used in combination with the aforementioned polyahls.

The polythiacyclic polyisocyanates employed in the practice of this invention are normally liquid, i.e., have a viscosity less than 3000 cps at 25° C., preferably less than 300 cps at 25° C. Accordingly, the polythiacyclic polyisocyanates are normally employed as mixtures of two or more isomers, each of which is normally solid but which in admixture with another compatible isomer forms a liquid at 25°–35° C. These polythiacyclic polyisocyanates are aliphatic compounds having (1) a bridge system of at least two rings, (2) a sulfur-containing bridging group, and (3) at least two isocyanate moieties bonded to carbons other than bridgehead carbons. Advantageously, the isocyanate moieties are bonded to the same or different non-sulfur bridging groups. In addition, it is desirable that at least one and preferably two of the non-sulfur bridging groups bear a pendant lower alkyl moiety such as methyl, ethyl or propyl, preferably methyl.

Representative preferred thiapolycyclic polyisocyanates include those having the formulae:

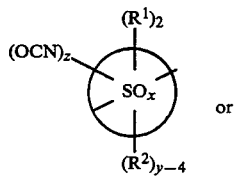

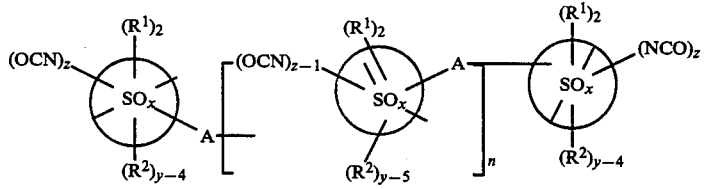

wherein A is a residue of an active hydrogen moiety such as —O—, —S—, —NR³—,

or CO₂—;

is a thiapolycyclic moiety having at least 6 carbons and a sulfur-containing bridging group; x is 0, 1 or 2; z is 0, 1, or 2, provided that each molecule of thiapolycyclic isocyanate has at least two isocyanate moieties; each $R^1$ is independently an alkyl group containing 1 to 3 carbon atoms, preferably methyl; each $R^2$ is independently hydrogen or methyl provided that at least two $R^2$ are hydrogen, preferably each $R^2$ is hydrogen; y is a number corresponding to available valences for the polycyclic ring; each $R^3$ is independently hydrogen, an aliphatic alkyl containing 1 to 20 carbon atoms or an inertly-substituted aliphatic alkyl containing 1 to 20 carbon atoms, with hydrogen being preferred; and n is 0, 1, 2 or 3. By "inert", it is meant that the substituent group will not react with isocyanate group or other group of the thiabicyclic compound, e.g., alkyl or alkoxy.

Alternatively, the thiapolycyclic polyisocyanate includes compounds represented by the formula:

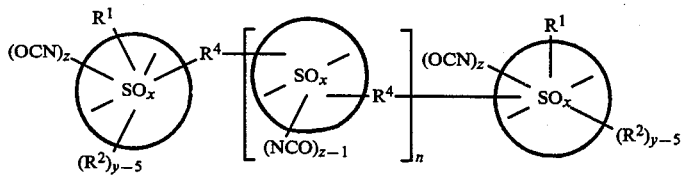

wherein $R^1$, $R^2$, x, y, z, n and A are as defined hereinbefore and $R^4$ is a divalent radical such as alkylene, e.g., ethylene, propylene or butylene.

Representative of the most preferred thiapolycyclic diisocyanates are those represented by the formulas:

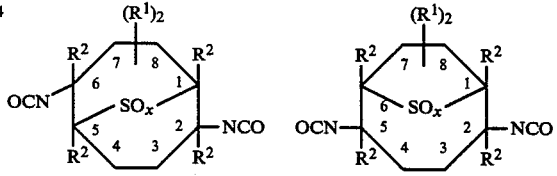

wherein each $R^1$, $R^2$, $R^3$ and x are as defined hereinbefore. Preferably, $R^3$ is hydrogen. Examples of such preferred thiabicyclic diisocyanates are dialkyl-9-thiabicyclononane diisocyanate isomers such as 2-endo-6-endo-2,6-diisocyanato-4-endo-8-exo-4,8-dimethyl-9-thiabicyclo[3.3.1]nonane; 2-endo-6-endo-2,6-diisocyanato-4-exo-8-exo-4,8-dimethyl-9-thiabicyclo[3.3.1]nonane; 2-endo-6-endo-2,6-diisocyanato-4-endo-8-endo-4,8-dimethyl-9-thiabicyclo[3.3.1]nonane;

2-endo-6-endo-2,6-diisocyanato-3-endo-7-endo-3,7-dimethyl-9-thiabicyclo[3.3.1]nonane; 2-endo-6-endo-2,6-diisocyanato-3-exo-7-exo-3,7-dimethyl-thiabicyclo[3.3.1]nonane; 2-endo-6-endo-2,6-diisocyanato-3-endo-7-exo-3,7-dimethyl-9-thiabicyclo[3.3.1]nonane; 2-endo-6-endo-2,6-diisocyanato-3-exo-4-exo-3,4-dimethyl-9-thiabicyclo[3.3.1] nonane; 2-endo-6-endo-2,6-diisocyanato-3-endo-4-exo-3,4-dimethyl-9-thiabicyclo[3.3.1] nonane; 2-endo-6-endo-2,6-diisocyanato-3-exo-4-endo-3,4-dimethyl-9-thiabicyclo[3.3.1]nonane; 2-endo-6-endo-2,6-diisocyanato-3-endo-4-endo-3,4-dimethyl-9-thiabicyclo[3.3.1]nonane; 2-endo-5-endo-2,5-diisocyanato-7-endo-8-endo-7,8-dimethyl-9-thiabicyclo[4.2.1]nonane; 2-endo-6-endo-2,6-diisocyanato-7-exo-1,7-dimethyl-9-thiabicyclo[3.3.1]nonane; 2-endo-6-endo-2,6-diisocyanato-7-endo-1,7-dimethyl-9-thiabicyclo[3.3.1]nonane; 2-endo-6-endo-2,6-diisocyanato-4-exo-1,4-dimethyl-9-thiabicyclo[3.3.1]nonane; 2-endo-6-endo-2,6-diisocyanato-4-endo-1,4-dimethyl-9-thiabicyclo[3.3.1]nonane; 2-endo-5-endo-2,5-diisocyanato-7-endo-1,7-dimethyl-9-thiabicyclo[3.3.1]nonane; with normally liquid mixtures of two or more such isomers being especially preferred.

Other isomers which are desirable include 2-endo-5-endo-2,5-diisocyanato-7-exo-8-exo-7,8-dimethyl-9-thiabicyclo]4.2.1]nonane; 2-endo-5-endo-2,5-diisocyanato-7-endo-8-exo-7,8-dimethyl-9-thiabicyclo[4.2.1]nonane; 2-endo-5-endo-2,5-diisocyanato-3-exo-4-exo-3,4-dimethyl-9-thiabicyclo[4.2.1]nonane; 2-endo-5-endo-2,5-diisocyanato-3-endo-4-endo-3,4-dimethyl-9-thiabicyclo[4.2.1]nonane; 2-endo-5-endo-2,5-diisocyanato-3-endo-4-exo-3,4-dimethyl-9-thiabicyclo[4.2.1]nonane; 2-endo-5-endo-2,5-diisocyanato-3-endo-7-exo-3,7-dimethyl-9-thiabicyclo[4.2.1]nonane; 2-endo-5-endo-2,5-diisocyanato-3-endo-7-endo-3,7-dimethyl-9-thiabicyclo[4.2.1]nonane; 2-endo-5-endo-2,5-diisocyanato-3-endo-7-exo-3,7-dimethyl-9-thiabicyclo[4.2.1]nonane; 2-endo-5-endo-2,5-diisocyanato-3-exo-7-endo-3,7-dimethyl-9-thiabicyclo[4.2.1]nonane; 2-endo-6-endo-2,6-diisocyanato-2-exo-7-exo-2,7-dimethyl-9-thiabicyclo[3.3.1]nonane; 2-endo-6-endo-2,6-diisocyanato-2-exo-7-endo-2,7-dimethyl-9-thiabicyclo[3.3.1]nonane; 2-endo-6-endo-2,6-dimethyl-2-exo-4-exo-2,4-dimethyl-9-thiabicyclo[3.3.1]nonane; 2-endo-6-endo-2,6-diisocyanato-2-exo-4-endo-2,4-dimethyl-9-thiabicyclo[3.3.1]nonane; 2-endo-5-endo-2,5-diisocyanato-2-exo-4-exo-2,4-dimethyl-9-thiabicyclo[4.2.1]nonane; 2-endo-5-endo-2,5-diisocyanato-2-exo-4-endo-2,4-dimethyl-9-thiabicyclo[4.2.1]nonane; 2-endo-5-endo-2,5-diisocyanato-2-exo-7-exo-2,7-dimethyl-9-thiabicyclo[4.2.1]nonane; 2-endo-5-endo-2,5-diisocyanato-2-exo-7-endo-2,7-dimethyl-9-thiabicyclo[4.2.1]nonane; 2-endo-5-endo-2,5-diisocyanato-4-exo-1,4-dimethyl-9-thiabicyclo[3.3.1]nonane; 2-endo-5-endo-2,5-diisocyanato-4-endo-1,4-dimethyl-9-thiabicyclo[3.3.1]nonane; and 2-endo-5-endo-2,5-diisocyanato-7-exo-1,7-dimethyl-9-thiabicyclo[3.3.1]nonane.

Synthesis of the preferred thiabicyclic diisocyanates advantageously begins by first reacting an aliphatic diene such as piperylene or 1,3-pentadiene, 1,3-hexadiene, 1,3-heptadiene, 5-methyl-1,3-hexadiene and/or other dienes represented by the formula:

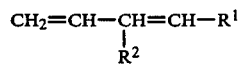

via cyclodimerization to form a cyclic octadiene having the structure:

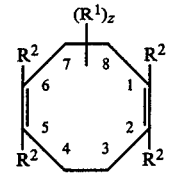

wherein $R^1$ and $R^2$ are as defined before. Alternatively, butadiene or isoprene can be cross-dimerized with piperylene or any of the other aforementioned dienes to produce the cyclic octadiene, or any two of said aforementioned dienes can be cross-dimerized to produce the desired cyclic octadiene. Piperylene is a preferred diene.

Such cyclodimerization of a diene is known as taught by J. A. Berson et al., JACS, 98 (19), pp. 5937–68 (1976) (Chem. Abstr. 86:70,9559); and U. M. Dzhemilev et al., Neftekhimiya, 15 (6), pp. 819–24 (1975) (Chem. Abstr. 84:121,2456); all of which are incorporated herein by reference. A preferred method of conducting the cyclodimerization of piperylene is by heating and stirring a mixture of piperylene in other hydrocarbons with a catalyst containing an iron (III) salt, a trialkyl aluminum compound and a chelating nitrogen liquid. Other suitable dienes can also be cyclodimerized by this procedure.

These processes yield varying amounts of the following isomers:

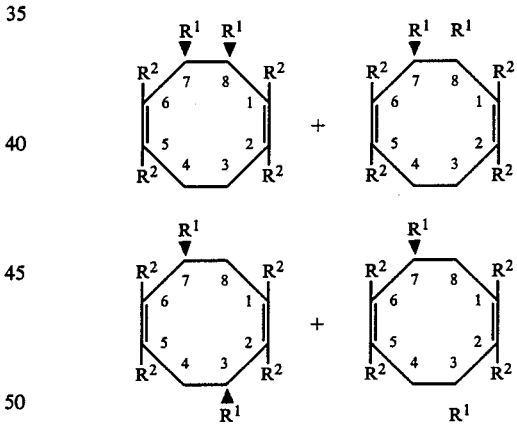

wherein the R group is methyl.

These isomers as well as isomers where y is 0 or 1 and $R^2$ is $CH_3$, are collectively included in the definition of the preferred cyclooctadienes. Note that the $R^1$ groups are positioned as shown in the foregoing formulae and are not attached to the carbons of the double bond.

The cyclooctadienes may be converted to a thiabicyclic dichloride by the reaction of the cyclooctadiene with sulfur dichloride as disclosed in Weil et al. in J. Org. Chem., 31 (6), pp 1669–1679 (1966); or Corey et al. in J. Org. Chem., 31 (6), pp. 1663–1668 (1966); or Tolstikov et al. in Zh. Org. Khim., 16 (7), pp. 1408–1418 (1980); or British Pat. Nos. 1,061,472; 1,061,473 and U.S. patent application Ser. No. 426,550 filed Sept. 29, 1982; all of which are incorporated herein by reference.

Such dichlorides are represented by the formulae:

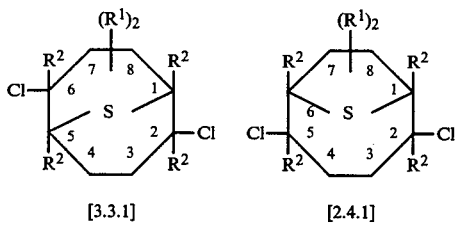

wherein the $R^1$ and $R^2$ groups are as defined before and the $R^1$ groups are connected to the 3, 4, 7 or 8 ring carbons, but not the carbons directly attached to either the sulfur or chlorine atoms (1, 2, 5, 6). Either or both of the [3.3.1] and [4.2.1] structures are found in the product as it has been found that the two structures are interconvertible during any reaction, even by merely dissolving in an ionizing solvent.

The dichloride is converted to the diisocyanate using conventional procedures. For example, the dichloride is contacted with a cyanate salt such as potassium cyanate in acetonitrile at room temperature. Other preferred salts include sodium and ammonium cyanate, with sodium cyanate being preferably employed in combination with a phase transfer catalyst. Suitable procedures and conditions for converting chlorides to isocyanates are described in U.S. Pat. Nos. 2,866,802 and 3,017,420.

The sulfoxide or sulfone, where x is 1 or 2, respectively, is prepared by the oxidation of the aforementioned diisocyanates or other thiapolycyclic polyisocyanates using oxidizing agents such as hydrogen peroxide and perbenzoic acid.

Further detailed discussion of the preparation of such diisocyanate including the sulfoxides and sulfones appears in U.S. patent application Ser. No. 426,550, filed Sept. 29, 1982 and now U.S. Pat. No. 4,458,061.

Thiapolycyclic polyisocyanates other than the aforementioned diisocyanates are prepared by similar techniques using the appropriate thiapolycyclic polychloride precursors. Such precursors are advantageously prepared by one of the following procedures:

The polyisocyanates which may be employed in combination with the thiapolycyclic polyisocyanates include aromatic, aliphatic and cycloaliphatic polyisocyanates and combinations thereof. Representative of these types are the diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4''-triphenylmethane triisocyanate, polymethylene polyphenylisocyanate and tolylene-2,4,6-triisocyanate; and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and polymethylene polyphenylisocyanate.

Crude polyisocyanates may also be used in the practice of the present invention, such as crude toluene diisocyanate obtained by the phosgenation of a mixture of toluenediamines or crude diphenylmethylene diisocyanate obtained by the phosgenation of crude diphenylmethylenediamine. The preferred undistilled or crude isocyanates are disclosed in U.S. Pat. No. 3,215,652.

Of particular interest are RIM formulations which contain chain extenders, especially reactive polyamines such as ethylenediamine, 1-(2-aminoisopropyl-4-methyl-4-aminocyclohexane), 1,2-propanediamine, 1,6-hexanediamine and 1,4-bis(aminomethyl)cyclohexane used in an amount effective to increase the modulus of the resultant polyurea or polyurethane-urea.

The urethane or urea reaction of thiapolycyclic polyisocyanate with one or a mixture of two or more of the aforementioned polyahls is advantageously practiced in the presence of an amount of urethane catalyst that is effective to catalyze the reaction of the polyahl with the

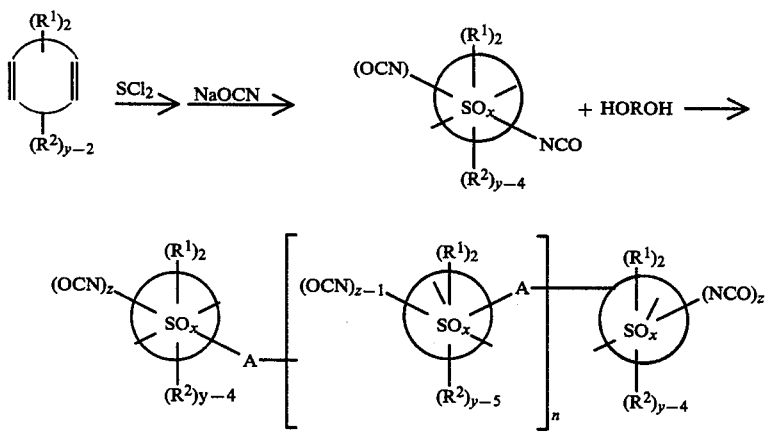

wherein

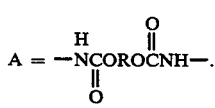

polyisocyanate. In the case of a reaction to form a urea linkage, a catalyst is not normally required. Preferably in the formation of the urethanes, the amount of urethane catalyst is an amount comparable to that used in conventional urethane type reactions, e.g., from about 0.05 to about 5, most preferably from about 0.1 to about 3, weight percent of the catalyst based on the weight of polyahl.

Any suitable urethane catalyst may be used including tertiary amines such as, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-dimethyl-N',N'-methyl isopropyl propylenediamine, N,N-diethyl-3-diethylaminopropylamine, dimethyl benzylamine and the like. Other suitable catalysts are, for example, tin compounds such as stannous chloride, tin salts of carboxylic acids such as dibutyltin di-2-ethyl hexanoate and dibutyltin dilaurate, as well as other organometallic compounds such as are disclosed in U.S. Pat. No. 2,846,408.

The relative proportions of the thiapolycyclic polyisocyanate to polyahl are those conventionally employed in the preparation of polyurethanes, polyureas and polyurea urethanes, preferably in proportions sufficient to provide isocyanate to active hydrogen equivalent ratios in the range from about 0.8:1 to about 1.5:1, most preferably from about 0.95:1 to about 1.1:1. The proportion of the thiapolycyclic polyisocyanate employed is that which is sufficient to improve mechanical and/or thermal properties of the polyurethane. Preferably, it is used in an amount sufficient to improve the light stability, tensile strength, optical properties or any combination of such properties for the resulting polyurethane. In the case of a polyurea or a polyurea urethane, the thiapolycyclic polyisocyanate is employed in an amount sufficient to improve light stability, resistance to heat sag, elongation, impact strength, processability or any combination thereof. More preferably, the amount of thiapolycyclic polyisocyanates is in the range from about 25 to about 100, most preferably from about 50 to about 100, weight percent of the thiapolycyclic polyisocyanate based on the weight of total polyisocyanate employed. The urethane catalyst is employed in amounts sufficient to catalyze the urethane reaction, preferably in amounts from about 0.05 to about 5, most preferably from about 0.1 to about 3, parts of catalyst per hundred parts of polyahl.

In addition to the foregoing components, it is understood that the polyurethane formulations of the present invention may also contain suitable amounts of conventional additives such as blowing agents, fillers, surfactants and other additives as such are described in U.S. Pat. No. 4,269,945, which is hereby incorporated by reference in its entirety.

The following examples are given to illustrate the present invention and are not to be construed as limiting the scope thereof in any manner. All parts and percentages are by weight unless otherwise indicated.

EXAMPLE 1

Polyurethane Preparation

Into the polyol side tank of a reaction injection molding machine are added a mixture of 6000 g (1.25 moles) of a glycerin-initiated polyalkylene polyol made from propylene oxide with sufficient ethylene oxide terminal groups (caps) to yield 80 percent of primary hydroxyl based on the total number of hydroxyl and having a weight ratio of PO to EO of 82:18 and a weight average molecular weight ($M_w$) of 4800–5000 (Polyol I), 1967 g (21.83 moles) of 1,4-butanediol, and 142 g (0.23 mole) of dibutyltin dilaurate (urethane catalyst). These ingredients are mechanically agitated and heated to 100° F. To the isocyanate tank of the reaction injection molding machine is added 6271 g (24.28 moles) of a normally liquid mixture of isomers of dimethyl-9-thiabicyclononane diisocyanate and then agitated and heated to 100° F. Specific gravities of the ingredients in each side tank of the reaction injection molding machine are 1.22 g/ml in the isocyanate tank and 1.04 g/ml in the polyol tank. The mixing pressure used for impingement is 1500 psi and the ingredients are shot into the mold using approximately a 0.65 lb shot size and a 40 lb/min throughput. The temperature of the mold is 155° F. and the in-mold time for each shot of material is 2 minutes. The dimensions of the mold cavity are 25.4×25.4×0.32 cm. Upon removal from the mold, the resulting molded article is placed in an oven at 120° C. for a post-cure of 30–90 minutes as indicated in the following Table II. The molded material is then tested for physical properties.

For purposes of comparison, several additional formulations are prepared using different concentrations of the same or different ingredients such as the diisocyanate, polyahl, polyamine chain extender and the like as specified in Table I. The resultant molded articles are similarly tested for physical properties and the results are reported in the following Table II.

Also for comparison, a conventional formulation is prepared using the foregoing ingredients except that diphenylmethane diisocyanate (MDI) or isophorone diisocyanate (IPDI) is substituted for the thiapolycyclic diisocyanate of the present invention. This control formulation is similarly processed and tested for physical properties and the results are reported in Table II.

TABLE I

| Sample No. | Diisocyanate[1] | | | Polyether Polyol[2] | | Diol[3] | | | Amine Extender[4] | | | Catalyst[5] |
|---|---|---|---|---|---|---|---|---|---|---|---|---|
| | Type | % | Equiv | % | Equiv | Type | % | Equiv | Type | % | Equiv | % |
| 1 | DMTBNI | 43.6 | 49.77 | 41.7(I) | 3.75 | BD | 13.68 | 43.65 | — | — | — | 1.0[a] |
| 2 | DMTBNI | 43.9 | 50.56 | 41.4(I) | 3.75 | BD | 13.70 | 44.12 | — | — | — | 1.0[a] |
| 3 | DMTBNI | 38.5 | 23.68 | 47.0(II) | 2.43 | BD | 7.0 | 13.27 | DETDA | 7.1 | 6.78 | 0.4[b] |
| C$_1$* | MDI | 47.5 | 50.20 | 39.46(I) | 3.75 | BD | 12.91 | 43.56 | — | — | — | 0.1[a] |

TABLE I-continued

| Sample No. | Diisocyanate[1] Type | % | Equiv | Polyether Polyol[2] % | Equiv | Diol[3] Type | % | Equiv | Amine Extender[4] Type | % | Equiv | Catalyst[5] % |
|---|---|---|---|---|---|---|---|---|---|---|---|---|
| C₂* | IPDI | 33.4 | 23.66 | 50.9(II) | 2.43 | BD | 7.6 | 13.34 | DETDA | 7.6 | 6.74 | 0.4[b] |

*Not an example of the invention
[1]DMTBNI — dimethyl-9-thiabicyclononane diisocyanate
IPDI — isophorone diisocyanate
MDI — diphenylmethane diisocyanate
% based on weight of total urethane formulation, equivalent of isocyanate functionality
[2](I) — Polyol I as defined
(II) — a PO/EO polyol (75% primary hydroxyl) wherein 30 mole percent of hydroxyl groups are substituted with primary amine groups
% based on total urethane formulation, equivalents of hydroxyl functionality (80% primary hydroxyl)
[3]BD — 1,4-butane diol
EG — ethylene glycol
% based on total urethane formulation, equivalents of hydroxyl functionality
[4]DETDA — diethyltoluenediamine
% based on total urethane formulation, equivalents of amine functionality
[5]$^a$dibutyltin dilaurate
$^b$mixture of (1) dimethyltin carboxylate (2 parts)
(2) 33% of triethylenediamine in dipropylene glycol (1 part)
(3) dimethyltin dilaurate (1 part)
% based on total urethane formulation

TABLE II

| Sample No. | Time min. | Tensile[1] Strength psi (MPa) | Modulus psi (MPa) | % Elongation | Flexural[2] Strength psi (MPa) | Modulus psi (MPa) | Izod[3] ft-lb/in (Joules/mm) |
|---|---|---|---|---|---|---|---|
| 1 | 90 | 2945 (20.3) | — | 180 | — | — | — |
| 2 | 90 | 2598 (19.9) | — | 186 | — | — | — |
| 3 | 90 | 2240 (15.4) | 38,000 (262) | 180 | 1381 (9.52) | 30,000 (207) | 6.79 (0.363) |
| C₁* | 90 | 1958 (13.5) | — | 60 | — | — | — |
| C₂* | 30 | 1600 (11.0) | 14,000 (96.5) | 480 | 716 (4.94) | 20,000 (138) | — |

*Not an example of the invention
[1]ASTM D 638
[2]ASTM D 790
[3]ASTM D 265

As evidenced by the data shown in Tables I and II, the polyurethanes prepared by the practice of the present invention (Sample Nos. 1–5) exhibit better tensile and flexural properties than do polyurethanes using conventional diisocyanates.

EXAMPLE 2

Into the polyol side tank of a reaction injection molding machine (Accuratio VR-60 RIM Machine) are added 6,743 g (1.35 moles) of a trifunctional polyether polyol having a $M_w$ of 5000 capped with approximately 87 percent with primary amine (sold by Texaco under the trade name Jeffamine T-5000, 1,212 g (6.8 moles) of diethyltoluenediamine, 243 g (4.1 moles) of ethylene diamine and 13.5 g of a delayed action urethane catalyst. These ingredients are mechanically agitated and heated to 140° F. (60° C.). To the isocyanate tank of the reaction injection molding machine is added 3,673 g (13.32 moles) of a normally liquid mixture of isomers of dimethyl-9-thiabicyclononane diisocyanate and then agitated and heated to 140° F. (60° C.). Specific gravities of the ingredients in each side tank of the reaction injection molding machine are 1.22 g/ml in the isocyanate tank and 1.04 g/ml in the polyol tank. The mixing pressure used for impingement is 2000 psi (140.74 kg/cm²) and the ingredients are shot into the mold using approximately a 0.65 lb (294 g) shot size and a 40 lb/min (18.1 kg/min) throughput. The temperature of the mold is 160° F. (71.1° C.) and the in-mold time for each shot of material is 2 minutes. The dimensions of the mold cavity are 25.4×25.4×0.32 cm. Upon removal from the mold, the resulting molded article is placed in an oven at 150° C. for a post-cure of 30 or 60 minutes as indicated in the following Table III. The molded material is then tested for physical properties.

For purposes of comparison, several additional formulations are prepared using different concentrations of various ingredients such as the diisocyanate, the aminated polyol, amine chain extenders and the like as specified in Table III. The resultant molded articles are similarly tested for physical properties and the results are reported in Table IV.

Also for comparison, a conventional formulation is prepared using the foregoing ingredients except that diphenylmethane diisocyanate is substituted for the thiapolycyclic diisocyanate of this example. This formulation is similarly molded and the results are reported in Table IV.

TABLE III

| Sample No. | Diisocyanate[1] Type | % | Equiv | Polyol[2] Type | % | Equiv | DETDA[3] % | Equiv | Other Diamine[4] Type | % | Equiv | Catalyst[5] Type | % |
|---|---|---|---|---|---|---|---|---|---|---|---|---|---|
| 1 | DMTBNI | 30.9 | 26.62 | T-5000 | 56.7 | 4.04 | 10.2 | 13.62 | EDA | 2.0 | 8.1 | UL-29 | 0.1 |
| 2 | DMTBNI | 26.2 | 15.46 | T-5000 | 61.5 | 3.00 | — | — | DAM | 12.3 | 11.72 | — | — |
| 3 | DMTBNI | 27.9 | 20.03 | T-5000 | 65.6 | 3.90 | — | — | PIP | 6.6 | 15.17 | — | — |
| C₁* | MDI | 57.21 | 73.95 | P-I | 29.85 | 3.50 | — | — | D-400 | 2.09 | 1.958 | T-12 | 0.03 |

TABLE III-continued

| Sample | Diisocyanate[1] | | | Polyol[2] | | | DETDA[3] | | Other Diamine[4] | | | Catalyst[5] | |
|---|---|---|---|---|---|---|---|---|---|---|---|---|---|
| No. | Type | % | Equiv | Type | % | Equiv | % | Equiv | Type | % | Equiv | Type | % |
| | | | | EG | 10.76 | 64.97 | — | — | | | | UL-28 | 0.06 |

*Not an example of the invention
[1]Same as [1] in Table I
[2]T-5000 — Jeffamine T-5000 sold by Texaco, P-I — Polyol I, same as defined in Example 1, EG — ethylene glycol
% based on weight of total polyurea formulation, equivalent of total amine and hydroxyl
[3]Diethyltoluene diamine
% based on total polyurea formulation, equivalent of amine functionality
[4]EDA — ethylene diamine, DAM — 1-(2-aminoisopropyl-4-methyl-4-aminocyclohexane, PIP — piperazine, D-400 — amine terminated polyol which is a diamine having an average of 5.6 propyleneoxy units per molecule and sold by Texaco under the trade name Jeffamine D-400
% based on total polyurea formulation, equivalent of amine functionality
[5]UL-29 — delayed action urethane catalyst, UL-28 — dimethyltin dilaurate, T-12 — dibutyltin dilaurate
% based on total polyurea formulation

TABLE IV

| Sample No. | Time min. | Tensile[1] | | | Flexura[2] | | Izod[3] | Heat Sag[4] in (m) |
|---|---|---|---|---|---|---|---|---|
| | | Strength psi (MPa) | Modulus psi (MPa) | % Elongation | Strength psi (MPa) | Modulus psi (MPa) | ft-lb/in (Joules/mm) | 6 in (0.15 m) |
| 2 | 60 | 1360 (9.38) | 43,000 (296) | 326 | 1090 (7.51) | 50,000 (345) | 9.64 (0.515) | 0.22 (0.0056) |
| $C_1$* | 30 | 3712 (25.6) | 80,000 (552) | — | 3790 (26.1) | 100,000 (689) | 7.27 (0.388) | 0.79 (0.020) |

*Not an example of the invention
[1]ASTM D 638
[2]ASTM D 790
[3]ASTM D 265
[4]ASTM D 3769-81 (30 min. at 325°F.)

As shown by the data in Tables III and IV, the polyureas prepared by the practice of the present invention (Sample No. 2) exhibit better heat sag properties than the polyurethane control sample (Sample No. $C_1$).

What is claimed is:

1. A reaction injection molding composition comprising a polyahl, a normally liquid thiapolycyclic polyisocyanate and a urethane catalyst, a urea catalyst or a mixture of a urethane catalyst and a urea catalyst in proportions such that, upon subjecting the composition to conditions of a reaction injection molding process, a useful article is formed.

2. The composition of claim 1 wherein the polyahl is a polyol and the thiapolycyclic polyisocyanate is a normally liquid isomeric mixture of two or more thiabicyclic diisocyanates.

3. The composition of claim 1 wherein the thiapolycyclic polyisocyanate is represented by one of the following structural formulas:

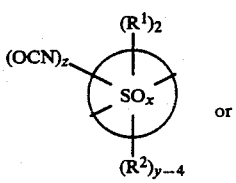

or

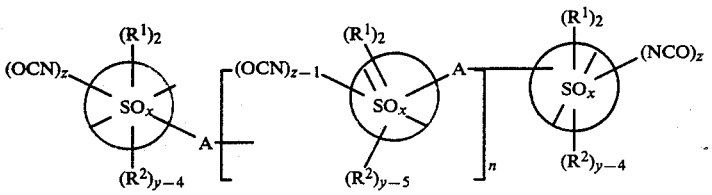

wherein A is a residue of an active hydrogen moiety such as —O—, —S—, —NR$^3$—,

or $CO_2$—;

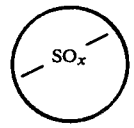

is a thiapolycyclic moiety having at least 6 carbons and a sulfur-containing bridging group; x is 0, 1 or 2; Z is 0, 1, or 2, provided that each molecule of thiapolycyclic isocyanate has at least two isocyanate moieties; each $R^1$ is independently an alkyl group containing 1 to 3 carbon atoms; each $R^2$ is independently hydrogen or methyl provided that at least two $R^2$ are hydrogen; y is a number corresponding to available valences for the polycyclic ring; each $R^3$ is independently hydrogen, an aliphatic alkyl containing 1 to 20 carbon atoms or an inertly-substituted aliphatic alkyl containing 1 to 20 carbon atoms; and n is 0, 1, 2 or 3.

4. The composition of claim 1 wherein the thiapolycyclic polyisocyanate is represented by one of the structural formulas:

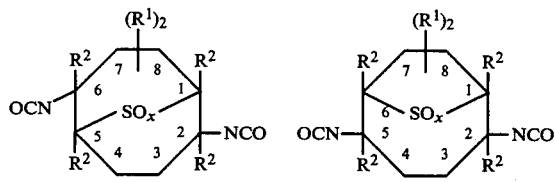

5. The composition of claim 2 wherein the thiapolycyclic polyisocyanate is a liquid mixture of dialkyl-9-thiabicyclononane diisocyanate isomers.

6. The composition of claim 1 wherein the polyahl is a polyalkylene ether polyol.

7. The composition of claim 1 wherein the polyahl is a polyamine.

8. The composition of claim 6 wherein (1) the ratio of polyisocyanate to the polyol is sufficient to provide from about 0.8:1 to about 1.5:1 of isocyanate equivalents to hydroxyl equivalents in the polyol and (2) a urethane catalyst is present in concentration from about 0.05 to about 5 parts per hundred parts of polyahl.

9. A process for making a reaction injection molded polyurethane, polyurea or polyurea/polyurethane which comprises subjecting in a one-shot procedure the composition of claim 1 to conditions sufficient to form a reaction injection molding.

10. A process for making a reaction injection molded polyurethane, polyurea or polyurea/polyurethane which comprises subjecting in a one-shot procedure the composition of claim 4 to conditions sufficient to form a reaction injection molding.

11. A process for making a reaction injection molded polyurethane which comprises subjecting in a one-shot procedure the composition of claim 8 to conditions sufficient to form a reaction injection molding.

12. A reaction injection molded article prepared from the composition of claim 1.

13. A reaction injection molded article prepared from the composition of claim 4.

14. A reaction injection molded article prepared from the composition of claim 8.

UNITED STATES PATENT AND TRADEMARK OFFICE
CERTIFICATE OF CORRECTION

PATENT NO. : 4,495,309  Page 1 of 3
DATED : January 22, 1985
INVENTOR(S) : Tonja R. Sutton, David R. Hughes It is certified that error appears in the above-identified patent and that said Letters Patent is hereby corrected as shown below:

Column 8, line 36 " 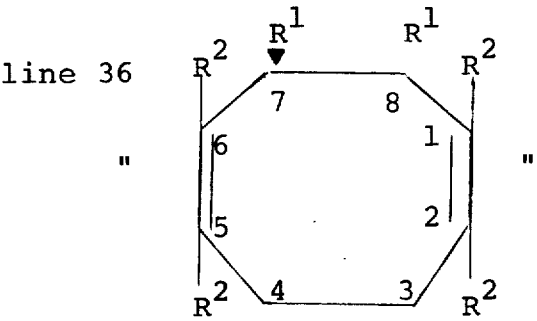 "

should be -- 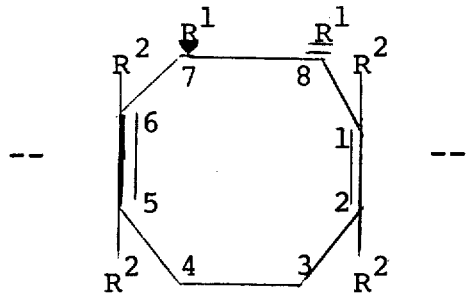 --

UNITED STATES PATENT AND TRADEMARK OFFICE
CERTIFICATE OF CORRECTION

PATENT NO. : 4,495,309

DATED : January 22, 1985

INVENTOR(S) : Tonja R. Sutton, David R. Hughes

It is certified that error appears in the above-identified patent and that said Letters Patent is hereby corrected as shown below:

Column 8, line 43    "    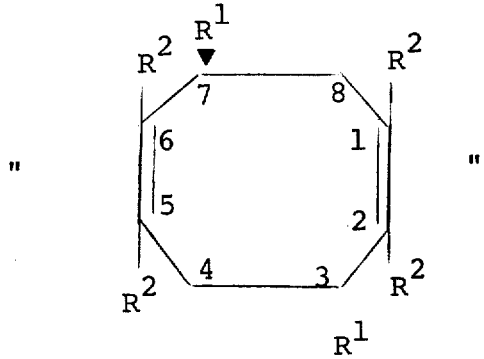    "

should be    --    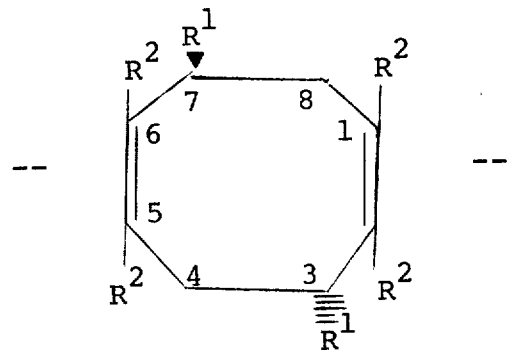    --

UNITED STATES PATENT AND TRADEMARK OFFICE
CERTIFICATE OF CORRECTION

PATENT NO. : 4,495,309  Page 3 of 3

DATED : January 22, 1985

INVENTOR(S) : Tonja R. Sutton, David R. Hughes

It is certified that error appears in the above-identified patent and that said Letters Patent is hereby corrected as shown below:

Columns 15 & 16, Table IV, heading "Flexura$^2$" should read -- Flexural$^2$ --.

Columns 15 & 16, approximate line 53, "o" suspended in space between columns should be deleted.

Signed and Sealed this

Thirteenth Day of August 1985

[SEAL]

Attest:

DONALD J. QUIGG

Attesting Officer   Acting Commissioner of Patents and Trademarks